United States Patent
Castro Cabado et al.

(10) Patent No.: US 10,988,588 B2
(45) Date of Patent: Apr. 27, 2021

(54) CURABLE RESIN FOR MINERAL WOOL

(71) Applicant: URSA Insulation, S.A., Madrid (ES)

(72) Inventors: María Mercedes Castro Cabado, Madrid (ES); Julio San Román Del Barrio, Madrid (ES); Arturo Luís Casado Domínguez, Madrid (ES)

(73) Assignee: URSA Insulation, S.A., Madrid (ES)

( * ) Notice: Subject to any disclaimer, the term of this patent is extended or adjusted under 35 U.S.C. 154(b) by 210 days.

(21) Appl. No.: 16/073,161

(22) PCT Filed: Dec. 14, 2016

(86) PCT No.: PCT/EP2016/081040
§ 371 (c)(1),
(2) Date: Jul. 26, 2018

(87) PCT Pub. No.: WO2017/129311
PCT Pub. Date: Aug. 3, 2017

(65) Prior Publication Data
US 2019/0062510 A1    Feb. 28, 2019

(30) Foreign Application Priority Data
Jan. 28, 2016   (EP) .................................. 16153179

(51) Int. Cl.
| | |
|---|---|
| *C08J 5/00* | (2006.01) |
| *C08J 5/24* | (2006.01) |
| *B27N 3/04* | (2006.01) |
| *C08K 5/092* | (2006.01) |
| *C08K 3/22* | (2006.01) |
| *C08B 30/18* | (2006.01) |
| *C08J 3/24* | (2006.01) |
| *F16L 59/02* | (2006.01) |
| *G10K 11/162* | (2006.01) |

(52) U.S. Cl.
CPC .................................... *C08J 5/24* (2013.01); *B27N 3/04* (2013.01); *C08B 30/18* (2013.01); *C08J 3/24* (2013.01); *C08K 3/22* (2013.01); *C08K 5/092* (2013.01); *F16L 59/028* (2013.01); *C08J 2305/02* (2013.01); *C08K 2003/2206* (2013.01); *C08K 2003/2296* (2013.01); *G10K 11/162* (2013.01)

(58) Field of Classification Search
None
See application file for complete search history.

(56) References Cited

U.S. PATENT DOCUMENTS

| | | | |
|---|---|---|---|
| 8,197,587 B2 | 6/2012 | Jaffrennou et al. | |
| 8,609,244 B2 * | 12/2013 | Zhang | C03C 11/002 |
| | | | 428/402 |
| 10,000,666 B2 | 6/2018 | Hawkins et al. | |
| 2006/0111480 A1 | 5/2006 | Hansen et al. | |
| 2009/0275699 A1 | 11/2009 | Zhang et al. | |
| 2011/0135937 A1 * | 6/2011 | Swift | C03C 25/14 |
| | | | 428/426 |
| 2011/0166275 A1 * | 7/2011 | Zhang | D04H 5/12 |
| | | | 524/397 |
| 2011/0223364 A1 * | 9/2011 | Hawkins | C09J 103/02 |
| | | | 428/34.5 |
| 2017/0096577 A1 * | 4/2017 | Abrami | C08K 3/08 |
| 2017/0210952 A1 | 7/2017 | Hampson et al. | |

FOREIGN PATENT DOCUMENTS

| | | |
|---|---|---|
| JP | 2002-129038 | 5/2002 |
| JP | 2005-533145 | 11/2005 |
| JP | 2011-506781 | 3/2011 |
| JP | 2014-515793 | 7/2014 |
| WO | 2009/053332 | 4/2009 |
| WO | 2009/080938 | 7/2009 |
| WO | 2012/118939 | 9/2012 |
| WO | 2016/009062 | 1/2016 |

OTHER PUBLICATIONS

PCT Search Report in corresponding application No. PCT/EP2016/081040.
Japanese Office Action dated Jul. 25, 2019 in parallel JP Application No. 2018/558478.

* cited by examiner

*Primary Examiner* — Stefanie J Cohen
(74) *Attorney, Agent, or Firm* — Dicke, Billig & Czaja, PLLC

(57) ABSTRACT

A curable resin and method is disclosed. In one example, the curable resin is for the manufacture of mineral fiber products such as mineral wool insulating products. The curable resin includes components a), b) and c), wherein a) is a saccharide, b) is a polycarboxylic crosslinking agent, and c) is a polyvalent metal oxide curing accelerator. In one example, the curable resin is formaldehyde free.

17 Claims, No Drawings

CURABLE RESIN FOR MINERAL WOOL

CROSS-REFERENCE TO RELATED APPLICATIONS

This Utility Patent Application claims priority under 35 U.S.C. § 371 to International Application Serial No. PCT/EP2016/081040, filed Dec. 14, 2016, which claims the benefit of EP Patent Application No. 16153179.3, filed Jan. 28, 2016; which are both incorporated herein by reference in their entirety.

FIELD THE INVENTION

The present invention relates to curable resins, preferably formaldehyde-free, for the manufacture of mineral fiber products such as mineral wool insulating products. The curable resin comprises a saccharide, a crosslinking agent and a curing accelerator.

BACKGROUND

Mineral wool products are widely used for the thermal and acoustic insulation of different parts of buildings, transportations, or other appliances, as well as for fire protection. Mineral wool materials are mainly randomly interlaced masses of mineral fibers with varying lengths and usually bound by a resin-based binder. Three types of mineral materials are most commonly employed; glass, stone or slag. Mineral wool is formed by an intricate network of fibers which might be bonded in their cross-over points by different means, e.g. by using a cured binder. Processes for the production of mineral wool products are well known in the art, and usually comprise the steps of melting the mineral material to an adequate temperature, fiberizing the molten mixture into fine fibers, application (e.g. spraying) of a binder composition to the individual fibers, collection of the fibers and formation of a primary fleece on a foraminous conveyor, densifying the fleece, and curing the binder at elevated temperatures. The cured mat is then cut to the desired size with transverse and edge trimmers and optionally rolled up, before it is packaged for transport.

The type and amount of binder used to bond the fibers in the mineral wool plays an important role in the final properties of the produced mineral wool. A variety of binder systems have been described in the art, including binders based on melamine urea formaldehyde resins, furane-based resins, and others, but phenol-formaldehyde resin based binders have been preferred for very long time, due to their good reactivity, superior performance and attractive low cost.

Environmental and toxicological concerns related to the formaldehyde released from the products manufactured with phenol-formaldehyde resin based binders have however led to a movement in the mineral wool industry to reduce or completely eliminate the use of such resins, or to reduce the amount of excess formaldehyde they contain. On the other side, there is an increased interest for binders with an increased amount of bio-based renewable components.

Free-formaldehyde binders comprising saccharides, such as monosaccharides, oligosaccharides, polysaccharides, etc., either as such or after modifications (e.g. hydrogenation, oxidation, functionalization), have been extensively investigated and some examples enjoy commercial success. In most cases, the saccharide is crosslinked with a multifunctional crosslinker in order to achieve a thermoset. Different crosslinking agents have been described, being the cross-linking with polycarboxylic compounds, both monomeric or polymeric, among the most frequently described thermosetting reactions. Some examples of this type of binders can be found in the patent publications WO 2012118939 A1, WO 2008053332 A1, WO 2009080938 A2, US 2009275699 A1.

One of the drawbacks of the binders based on saccharides and polycarboxylic compounds described for the manufacture of mineral wool is the relative slower pace of the thermosetting reaction if compared with phenol-formaldehyde resins or acrylic resins. That slower reaction is found detrimental in the manufacturing of mineral wool in industrial continuous processes. In order to obtain sufficient curing, the energy applied for curing has to be increased by increasing the residence time in the curing oven of the binder and/or by raising the temperature in the curing oven. In some cases, the increased energy applied might even lead to unwanted decomposition of the binder. Curing catalysts, such as phosphorous containing acids and salts, have been described to improve the speed of curing for binders comprising saccharides and polycarboxylic crosslinking agents.

US 20110166275 A1 describes formaldehyde-free binders including a polycarboxy compound and an organic crosslinking agent, such as a polyol, and a polyvalent metal compound. The addition of polyvalent metal compound results in binders with increased mechanical strength and/or improved water resistance.

There is however still a need for alternative curable formaldehyde-free resin compositions for the manufacture of mineral wool products, which comprise saccharides and polycarboxylic crosslinking agents, and which show an improved crosslinking profile, and which can be cured efficiently during mineral wool industrial manufacturing. In addition, there is a need for a curing accelerator for the thermosetting reaction of saccharides and polycarboxylic crosslinking agents, which is readily available and economically attractive.

DETAILED DESCRIPTION

In view of the above, the invention is directed to a curable resin, preferably formaldehyde-free, according to the claims. The inventive resin shows an improved curing profile, with a shorter gel-time, and is very suitable for the preparation of a binder for the manufacture of mineral wool. The invention also concerns a method for the preparation of an improved curable resin and the mineral wool manufactured by using the curable resin of the invention. Furthermore, the invention also relates to the use of polyvalent metal oxide as a binder curing accelerator in the manufacture of mineral wool materials, wherein the binder comprises a saccharide and a polycarboxylic crosslinking agent.

In a first embodiment, it is provided a curable resin for the manufacture of mineral wool, comprising, or alternatively consisting of, components a), b) and c), wherein a) is a saccharide, b) is a polycarboxylic crosslinking agent, and c) is a polyvalent metal oxide curing accelerator.

In certain embodiments, the polyvalent metal oxide curing accelerator is selected from oxides of metals of the group 2 or 12 of the IUPAC periodic table of elements. Particularly preferred is when the polyvalent metal oxide is from a divalent metal, and more preferably selected from the group of calcium oxide, zinc (II) oxide and mixtures thereof.

Preferably, in the resin of any of the embodiments, the amount of the polyvalent metal oxide curing accelerator ranges from 0.5-10 wt.-% in relation to the sum of the weights of the components a), b) and c).

In certain embodiments, the polycarboxylic crosslinking agent is a polycarboxylic compound with a weight average molecular weight <5,000 g/mol. The weight average molecular weight of the polycarboxylic crosslinking agent is preferably at least 90 g/mol, more preferably at least 100 g/mol.

The polycarboxylic crosslinking agent in preferred embodiments is selected from the group of citric acid, succinic acid, tartaric acid, maleic acid, their corresponding anhydrides, the salts thereof, and mixtures thereof. More preferably, the polycarboxylic crosslinking agent is selected from the group of citric acid, citrate salts (e.g. metal or ammonium citrate salts), and mixtures thereof.

The resin of any of the previous embodiments, optionally further comprises a polyol different than a saccharide, preferably with a molecular weight <400 g/mol, preferably selected from the group of alkene glycol, sugar alcohol, and mixtures thereof. In additional preferred embodiments, the polyol is a sugar alcohol selected from glycerol, sorbitol, maltitol and mixtures thereof.

The saccharide comprised in the curable resin of the embodiments is preferably selected from monosaccharide, disaccharide, oligosaccharide, polysaccharide, or mixtures thereof. More preferably, the saccharide is an oligosaccharide or a polysaccharide with a weight average molecular weight of at least 1,000 g/mol, advantageously at least 10,000 g/mol, more advantageously of at least 100,000 g/mol. Preferred saccharides have a dextrose equivalent of less than 100, advantageously less than or equal to 50, more advantageously less than or equal to 15. Examples of preferred oligosaccharides include glucose syrup, fructose syrup, and molasses. Examples of preferred polysaccharides include pectin, dextrin, maltodextrin and starch. In the particular case of starch, this might be native starch (including waxy native starch), modified (pre-gelatinized, acid or enzyme hydrolysed, etc.) starch or water soluble starch.

In preferred embodiments of the curable resin, the amount of saccharide is at least 20 wt.-%, preferably at least 40 wt.-%, related to the sum of the weights of the components a), b) and c).

In similarly preferred embodiments of the curable resin, the amount of saccharide a) ranges from 20-80 wt.-%, the amount of polycarboxylic crosslinking agent b) ranges from 20-80 wt.-%, and the amount of polyvalent metal oxide curing accelerator c) ranges from 0.5-10 wt.-%, all amounts related to the sum of the weights of the components a), b) and c).

In still preferred embodiments, the inventive curable resins are substantially free of a polymer from unsaturated carboxylic monomers.

Preferably, in certain embodiments the sum of the weight of the components a), b) and c) amounts to at least 70 wt.-% of the dry weight of the curable resin, more preferably at least 80 wt.-%, and even more preferably at least 90 wt.-%.

Through this specification, by substantially free it is meant that the concentration of the compound is sufficiently low as to be negligible. In this context, it should be understood however that the compound might be present as traces, e.g. from cross-contamination, preferably at a concentration of ≤0.1 wt.-% related to the sum of the weights of the resin components a), b) and c).

The resin of additional embodiments is preferably substantially free of any polycarboxylic compound with a weight average molecular weight >400 g/mol. In other words, in preferred embodiments the polycarboxylic crosslinking agent has a weight average molecular weight less or equal than 400 g/mol, and no other polycarboxylic compound with a weight average molecular weight higher or equal than 400 g/mol is contained in the curable resin.

Along this disclosure, it should be understood that the weight average molecular weight of a non-polymeric compound equals its molecular weight.

Through this description and in the claims, the weight percentages given for the three components, saccharides, polycarboxylic crosslinking agent and polyvalent metal oxide, are indicated for the compounds as such, in their pure form, excluding any impurities, humidity or solvents which they might contain, e.g. in their commercially available forms.

Another aim of the present invention is to provide a method for the manufacture of the curable resin.

Additional embodiments of the invention relate to an aqueous binder, preferably formaldehyde-free, for the manufacture of mineral wool, comprising the curable resin of any of the embodiments disclosed. The binder preferably further comprises 1-5 wt.-% of silane and/or 1-20 wt.-% of oil related to the dry weight of the binder. The binder is preferably aqueous and has a dry weight of preferably 4 to 20 wt.-%. In certain embodiments, the binder is substantially free of polymers from unsaturated carboxylic monomers.

The invention is also directed to the mineral wool products manufactured using the curable resin or the aqueous binder. The mineral wool product comprises mineral fibers and cured binder, wherein the cured binder is obtained by curing at >100° C. an aqueous binder according to the embodiments disclosed herein.

Very useful binders for mineral wool can be obtained from the curable resins of the invention, which show suitable properties for the application in the manufacture of mineral wool, as well as sufficient stability. Furthermore, the curable resin can be conveniently diluted with large amounts of water to obtain the low dry weight required for the application as a binder.

In an aspect, the invention relates to a method for the manufacture of mineral wool, comprising: i) spraying a binder composition to the surface of individual mineral fibers formed by fiberization, the binder composition comprising a resin according to any of the embodiments disclosed herein; ii) collecting the impregnated fibers on a conveyor; iii) transporting the collection of fibers to a heated curing oven; and iv) curing the binder at a temperature above 100° C., preferably for at least 1 minute.

The invention also concerns the use of polyvalent metal oxide as a binder curing accelerator in the manufacture of mineral wool materials, wherein the binder comprises a saccharide and a polycarboxylic crosslinking agent. The saccharide and the polycarboxylic crosslinking agent are preferably the ones described in the embodiments of the curable resin herein.

The curable resins of the invention show an improved curing profile, with a shorter gel-time when compared to similar resins without any curing accelerator. This shorter gel-time results in a more efficient formation of thermoset during curing, and allows to use reduced temperatures or to reduce residence time of the binder in the curing oven. This accelerated curing effect is surprising and not anticipated by the prior art, particularly not in US 20110166275 A1, probably due to the fact that saccharides, which tend to cure more slowly, are not considered as suitable resin components in that US patent publication.

According to the present invention, the curable resin comprises a) a saccharide, b) a polycarboxylic crosslinking agent, and c) a polyvalent metal oxide as curing accelerator. The resin optionally further comprises a polyol different than a saccharide, preferably selected from the group of alkene glycol, sugar alcohol, and mixtures thereof. The curable resin might be an aqueous composition in the form of a solution, an emulsion or a dispersion.

The resin of the invention is preferably formaldehyde-free. In the context of the invention, formaldehyde-free is used in the sense of indicating that essentially no formaldehyde is contained in the resin. In other words, by essentially no formaldehyde is meant that the concentration of formaldehyde in the resin of this embodiment is <0.1 wt.-% relative to sum of the weights of the a), b) and c) resin components, more preferably <0.01 wt.-% and even more preferably zero.

The inventive resin is curable, meaning that it undergoes a (thermo)setting reaction (hardening or curing reaction), e.g. when heated over 100° C. in a curing oven. Without wanting to be bound by theory, it is believed that the resin of the invention cures by the crosslinking reaction between multiple carboxylic groups of the polycarboxylic crosslinking agent, and multiple hydroxyl groups in the chains of the saccharide (and the optional polyol). However, other curing reactions and/or setting mechanisms like chemical/physical interactions (hydrogen bonding, physical entrapment, etc.) might also play a role in the curing of the resin in the curing oven.

Through this description, the term "resin" refers to the mixture of unreacted or partially reacted components which will form a crosslinked polymeric network after curing. The resin is usually stored before it is used, although it might as well be used just after it is prepared. The term "binder" refers to the aqueous mixture of components which is applied to the fibers in the manufacture of mineral wool products and subsequently cured to produce the bonding by the cured binder of the fibers at their cross-over points. The binder is commonly prepared on-site, meaning that the binder is prepared in the mineral wool production plant, usually continuously, a few minutes (1-5 minutes) before it is applied to the fibers. In most cases, the resin will be largely diluted with fresh water or process water and mixed with additives in the mineral wool manufacturing lines in order to prepare the binder. By "additives" it is meant the substances which are usually needed either to assist in the manufacture of mineral wool products, or to improve the properties of the manufactured products. The resin will then be comprised as a component in the binder. In exceptional cases, where no additives are used, the resin and the binder will be the same (except for the occasional dilution of the resin with water to prepare the binder).

According to the invention, saccharide is understood to cover organic compounds which are made up of a whole-number of monosaccharide units. When the number of repeating units in the saccharide is higher than 1, the monosaccharides are linked to each other by glycosidic bonds. The parent monosaccharides of the repeating units might be aldoses and/or ketoses, and they have the general formula $C_nH_{2n}O_n$, where n is a positive integer, usually between 3 and 7. According to this definition, the saccharide term according to the embodiments is different from sugar alcohols (obtained by reduction or hydrogenation of sugars), i.e. different from sorbitol or maltitol, and does not include those.

The saccharide comprised in the curable resin of the embodiments is preferably selected from monosaccharides, disaccharides, oligosaccharides, polysaccharides, or mixtures thereof. More preferably, the saccharide is an oligosaccharide or polysaccharide with an weight average molecular weight of at least 1,000 g/mol, advantageously at least 10,000 g/mol, more advantageously of at least 100,000 g/mol. Preferred saccharides have a dextrose equivalent of less than 100, advantageously less than or equal to 50, more advantageously less than or equal to 15. Examples of preferred monosaccharides include glucose, xylose and fructose. Examples of preferred disaccharides include sucrose, maltose and lactose. Examples of preferred oligosaccharides include glucose syrup, fructose syrup and molasses. Examples of polysaccharides include pectin, dextrin, maltodextrin and starch. In the particular case of starch, this might be native starch, modified (pre-gelatinized, hydrolysed, etc) starch or water soluble starch. The starch might originate from different natural sources, usually plants, such as potato, maize, wheat, etc.

In one specific embodiment, the saccharide is a water-insoluble native starch. Native starch is the form of starch as it occurs in the nature, e.g. in the potato, maize, wheat and cassava plants from which it is obtained. Native starch has therefore not been physically, chemically or enzymatically modified, dextrinized or pre-gelatinized. As such, native starch is a long-chain polysaccharide composed of glucose repeating units joined by glycosidic bonds. Native starch is insoluble in cold water and ethanol, and it is present in the plants in form of semi-crystalline granules. Two different components are found to form native starches, which are distinguished by their molecular weight and their chain structure: 1) amylose: linear polysaccharide chains with weight-average molecular weight of approx. $10^5$-$10^6$ g/mol; and 2) amylopectin: branched polysaccharide chains with weight-average molecular weight of approx. $10^6$-$10^8$ g/mol. In this particular embodiment, it is aimed that the water-insoluble native starch contained in the resin is applied as such (un-modified) to the mineral fibers. Since the native starch is water insoluble, the resin and the binder comprising native starch are in form of dispersions.

The curable resin of the embodiments comprises polycarboxylic crosslinking agent, preferably with a weight average molecular weight <5,000 g/mol. The term polycarboxylic crosslinking agent as used herein is to be understood to cover the polycarboxylic acids, any salts thereof and any precursor thereof, such as anhydrides, as well as the mixtures thereof. The polycarboxylic crosslinking agent is embodied by organic compounds formed by small molecules or by polymers, preferably with a weight average molecular weight of <5,000 g/mol. By the term polycarboxylic it is meant herein that the compound carries more than one carboxylic moiety per molecule, at least two carboxylic moieties, more preferably at least three carboxylic moieties per molecule. Polycarboxylic acid precursors are understood here as compounds capable of forming polycarboxylic acid in the resin mixture, under the conditions present during the preparation and/or the use of the resin or the binder of the invention, either prior or during curing. These conditions include e.g. increased temperatures or pH variations. Unless specifically stated otherwise, through this description and in the claims, the weight percentages and the molecular weights of polycarboxylic acid salts or precursors are indicated for the corresponding acid form.

Exemplary polycarboxylic crosslinking agents are dicarboxylic, tricarboxylic and tetracarboxylic acids, derivatives thereof, and mixtures thereof. Thus, the polycarboxylic crosslinking agent might be chosen from oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid, tetrahydrophthalic acid, isophthalic acid, terephthalic acid, mesaconic acid, citraconic acid, citric acid, tricarballylic acid, 1,2,4-butane-tricarboxylic acid, aconitic acid, hemimellitic acid, trimellitic acid, trimesic acid, 1,2,3,4-butanetetracarboxylic acid, pyromellitic acid, and mixtures thereof. However, particularly preferred polycarboxylic crosslinking agent is selected from the group of citric acid, succinic acid, tartaric acid, maleic acid, their corresponding anhydrides, the salts thereof, and mixtures thereof. In this regard, preferred polycarboxylic acid salts are alkali salts and/or ammonium salts, e.g. sodium salts.

More preferably, the polycarboxylic crosslinking agent is selected from the group of citric acid and citrate salts (e.g. alkali or ammonium citrate salts, such as sodium citrate).

In alternative embodiments, the curable resin is substantially free of a polymer from unsaturated carboxylic monomers. Polymer in the context of the invention is considered a compound formed by linking together a number of repeating monomeric units by polymerization. With polymers from unsaturated carboxylic monomers are understood particularly homo- and copolymers formed by polymerization of unsaturated carboxylic monomers, such as polyacrylic acid, polymethacrylic acids, polymaleic acid, polymaleic anhydride, esters and salts thereof.

In preferred embodiments, the curable resin is substantially free of any polycarboxylic compound with weight average molecular weight of 5,000 g/mol or more. The polycarboxylic crosslinking agent is preferably non-polymeric with a molecular weight less or equal than 400 g/mol.

The resin of additional embodiments is preferably substantially free of any polycarboxylic compound, either monomeric or polymeric, with a weight average molecular weight >400 g/mol.

In certain embodiments of the present invention, the curable resin comprises a polyol different than a saccharide with a molecular weight <400 g/mol. The polyol is understood as an organic alcohol compound containing at least two hydroxyl groups per molecule. According to preferred embodiments of the invention, the polyol is selected from the group of alkene glycol, sugar alcohol, and mixtures thereof.

The amount of polyol different than a saccharide preferably ranges from 1-25 wt.-%, more preferably from 1-10 wt.-%, related to the sum of the weights of the saccharide, polycarboxylic crosslinking agent and the polyvalent metal oxide.

In certain embodiments, the polyol comprises an alkene glycol. In this description, alkene glycols are organic diols with two hydroxy groups in two different carbon atoms. Preferably, the carbon atoms carrying the hydroxy groups are vicinal. They can also be described as alcohols derived from ethylene glycol. The term "alkene glycols", as used herein, also include diols obtained by condensation of ethylene glycol, in which the hydroxy groups are located in non-adjacent carbon atoms. Preferred alkene glycols are ethylene glycol, propylene glycol, trimethylene glycol (1,3-propane diol), neopentyl glycol, diethylene glycol, triethylene glycol and polyethylene glycol. More preferably, the alkene glycol is selected from ethylene glycol, propylene glycol and mixtures thereof. Even more preferably, the alkene glycol is ethylene glycol.

In further embodiments, the polyol comprises a sugar alcohol. "Sugar alcohol" is understood to mean compounds obtained when at least some of the aldo or keto groups of a sugar are reduced (e.g. by hydrogenation) to the corresponding hydroxy groups. The starting sugar subjected to reduction might be chosen from monosaccharides, oligosaccharides and polysaccharides, and mixtures of those products, such as syrups, molasses and starch hydrolyzates. Although sugar alcohols closely resemble the corresponding starting sugars, they are not sugars. Thus, for instance, sugar alcohols have no reducing ability, and cannot participate in the Maillard reaction typical of reducing sugars. Preferred sugar alcohols according to the invention are glycerol, erythritol, arabitol, xylitol, sorbitol, maltitol, mannitol, iditol, isomaltitol, lactitol, cellobitol, palatinitol, maltotritol, syrups thereof and the products from the hydrogenation of starch hydrolyzates with average weight molecular weight <400 g/mol. More preferably, the sugar alcohol is selected from glycerol, sorbitol, maltitol, and mixtures thereof.

The curable resin further comprises a polyvalent metal oxide as curing accelerator. By curing accelerator it is meant the term as commonly understood in the field, this is, that the polyvalent metal oxide is capable of accelerating the crosslinking reaction in relation to the speed of the reaction in the absence of this accelerator. By polyvalent metal it is meant a metal element having a valence higher than 1 that can form two or more chemical bonds with other atoms. According to the invention, the curing accelerator is formed by an oxide of a polyvalent metal. Preferably, the curing accelerator is the oxide of a divalent metal. Still preferably, the divalent metal is a metal of the group 2 or group 12 of the IUPAC periodic table of elements. Particularly preferred, the polyvalent metal oxide curing accelerator is selected from the group of calcium oxide, zinc (II) oxide and mixtures thereof. It should be understood that the definition of polyvalent metal oxide includes related compounds, which are the forms of the respective oxide at different pH values, in solution, or which are precursors of the corresponding oxide at the conditions present during use of the resin. Examples of polyvalent metal oxide related compounds are polyvalent metal hydroxides. Preferably, the polyvalent metal oxide selected has a low toxicity profile. In certain embodiments, the curable resin is free from arsenic, mercury, lead and cadmium oxides. In other words, the polyvalent metal oxide curing accelerator is preferably selected from metals having a low toxicity.

The pH of the resin or the binder of the invention might be suitably adjusted with pH modifiers, including acids, such as sulfuric acid, phosphoric acid and/or hydrochloric acid, volatile bases (e.g. ammonia, amines) and non-volatile bases (e.g. NaOH). Depending on this pH value, the carboxylic groups contained in the polycarboxylic crosslinking agent may be partially neutralized, forming the corresponding carboxylic salts (e.g. ammonium and sodium salts respectively for the exemplary bases above). It is preferred that the pH of the binder is acidic, preferably lower than 3, more preferably lower than 2, to obtain efficient curing. It is also possible to prepare the resin with a higher pH, in the range 3-8, by using a volatile base such as ammonia. During drying and curing of the resin, the volatile base is evaporated and the pH of the remaining binder composition on the fibers is decreased to the acidic pH more suitable for curing.

The suitable method for the manufacture of the curable resin according to embodiments comprises preparing an aqueous composition comprising the polyvalent metal oxide curing accelerator, and contacting it in any order with the polycarboxylic crosslinking agent and with a saccharide. The aqueous composition might be a solution, an emulsion or a dispersion in water, depending on the solubility of the components.

In preferred embodiments of the method, the polycarboxylic crosslinking agent is dissolved or dispersed in water, and then the corresponding amount of the polyvalent metal oxide curing accelerator is added to it. Next, the corresponding amount of saccharide is contacted with the water composition prepared in the previous step, either as a solid added to it, or diluted, dissolved or dispersed in a solvent, e.g. water. Sufficient stirring assures the homogeneous mixture of the components.

In order to avoid premature curing reaction, the mixture of the components should preferably be kept at a temperature lower than 60° C., preferably at a maximum temperature of 30° C.

Obviously, when the resin to be prepared is substantially free of polymer from unsaturated polycarboxylic monomers, the method for preparing the resin of the invention does not comprise any step wherein the resin is combined with such polymers.

The method for preparing the resin can be varied and is not limited to the embodiments described herein. For instance, the method may as well comprise the step of adding the polyvalent metal curing accelerator (either as such or together with a diluent) to an aqueous composition comprising the polycarboxylic crosslinking agent and the saccharide.

In another variation of the method of the invention, a polyol different than a saccharide with molecular weight <400 g/mol and/or other optional additives might be contacted with the mixture of the components of the curable resin.

The amount of polycarboxylic crosslinking agent might range from 20-80 wt.-%, preferably from 30-70 wt.-% and more preferably from 40-60 wt.-%, related to the sum of the weights of saccharide, polycarboxylic crosslinking agent and polyvalent metal oxide components.

The amount of polyvalent metal oxide curing accelerator might range from 0.5-10 wt.-%, preferably from 1-5 wt.-%, related to the sum of the weights of saccharide, polycarboxylic crosslinking agent and polyvalent metal oxide components.

The amount of saccharide might range from 20-80 wt.-%, preferably from 30-70 wt.-% and more preferably from 40-60 wt.-%, related to the sum of the weights of saccharide, polycarboxylic crosslinking agent and polyvalent metal oxide curing accelerator components.

The relative amounts of saccharide, polycarboxylic crosslinking agent and polyvalent metal oxide disclosed above might be varied independently of each other, as long as the sum of the weights of the three components saccharide, polycarboxylic crosslinking compound and polyvalent metal oxide curing accelerator adds to 100 wt.-%.

Preferably, the amount of saccharide ranges from 20-80 wt.-%, the amount of polycarboxylic crosslinking agent ranges from 20-80 wt.-%, and the amount of polyvalent metal oxide curing accelerator ranges from 0.5-10 wt. %, in relation to the sum of the weights of three components. This means, that the sum of the three concentration wt.-% values selected from the ranges above adds to 100 wt.-%. Also preferably the amount of saccharide in the resin ranges from 30-70 wt.-%, the amount of polycarboxylic crosslinking agent ranges from 30-70 wt.-%, and the amount of polyvalent metal oxide curing accelerator ranges from 0.5-10 wt.-%, in relation to the sum of the weights of the three components. More preferably the amount of saccharide in the resin ranges from 40-60 wt.-%, the amount of polycarboxylic crosslinking agent ranges from 40-60 wt.-%, and the amount of polyvalent metal oxide curing accelerator ranges from 1-5 wt.-%, in relation to the sum of the weights of the three components.

Preferably, the sum of the weights of the three components saccharide, polycarboxylic crosslinking agent and polyvalent metal oxide amounts to at least 70 wt.-% of the dry weight of the curable resin, more preferably at least 80 wt.-%, and even more preferably at least 90 wt.-%.

In preferred embodiments, the molar ratio between the hydroxyl groups in the saccharide component and the carboxyl groups in the polycarboxylic crosslinking agent is at least 1. This means that in these embodiments the hydroxyl groups from the saccharide are in molar excess relative to the carboxyl groups from the polycarboxylic crosslinking agent. More preferably, this molar ratio hydroxyl/carboxyl is at least 1.2, and even more preferably at least 1.5.

When the inventive curable resin is used in a binder for the manufacture of mineral wool, the binder might be prepared by providing the resin, adjusting the dry weight with water to a preferred 4 to 20 wt.-% range and optionally mixing it with additives.

In the context of this disclosure, dry weight is defined as the weight fraction of residue remaining after drying the aqueous composition at 135° C. for 1 hour in a ventilated oven.

In a preferred embodiment, in addition to the curable resin, other additives are added to the binder composition. Thus, the binder preferably comprises, in addition to the curable resin, 1-5 wt.-% of a silane compound and/or 1-20 wt.-% of oil related to the dry weight of the binder. The silane compound is preferably an aminosilane. The oil additive is preferably mineral oil.

The binder might include further additives either to assist in the manufacture of mineral wool products, or to improve the properties of the manufactured products. Non-limiting examples of such additives are hydrophobizing agents such as silicones and fluorocarbon-polymers, fiber softeners, fillers, preservatives, dyes and/or corrosion inhibitors. The amount of these optional additives in the binder does not exceed 20 wt.-% and preferably does not exceed 10 wt.-% of the dry weight of the binder.

The time from the moment the binder additives are contacted with the resin until the binder is applied to the mineral fibers usually ranges from 1 to 5 minutes. It is also possible, according to an embodiment, that these additives, provided they do not compromise the stability, might as well be incorporated already in the curable resin, before the binder is prepared.

In certain embodiments, the binder of the invention might be then applied by spraying to the individual mineral fibers after fiberization, e.g. by a centrifugal spinner, while the fibers still retain some residual heat. The impregnated fibers are then collected on a foraminous conveyor in a forming chamber, where a primary un-cured mat is formed. A significant part of the water comprised in the binder is evaporated at this stage.

The binder is preferably applied in an amount to produce a binder content in the final product after drying and curing between 3-12 wt.-%, relative to the weight of the mineral wool product. This amount of cured binder is measured as LOI (loss on ignition) according to ISO 29771:2008.

After the fibers have been impregnated and the primary mat is formed, the inventive binder is cured at temperatures above 100° C., preferably at a temperature between 140-180° C. The curing time preferably ranges from 3-5 min. The cured mineral wool mat is afterwards trimmed and shaped into its final dimensions, optionally rolled up, and packaged. Additional facing layers like paper, aluminum, glass fiber veil or mixtures thereof might also be applied to the mineral wool depending on its intended application.

Thus, an aspect of the invention concerns to a method for the manufacture of mineral wool, comprising spraying a binder composition to the surface of individual mineral fibers formed by fiberization. In this method, the binder composition is provided in the form of an aqueous composition comprising a resin according to any of the embodiments disclosed herein. The method further comprises a step of collecting the impregnated fibers on a conveyor, and transporting the collection of fibers (or mat) to a heated curing oven, where the binder is cured at a temperature above 100° C., preferably for at least 1 minute. Preferably, the binder composition is provided with a dry weight of 4-20 wt.-%.

In certain embodiments of the invention, the curable resin consists of the components a), b) and c) without any additional component apart from the diluent (e.g. water), wherein a) is saccharide, b) is a polycarboxylic crosslinking agent, and c) is a polyvalent metal oxide, the polyvalent metal oxide being preferably selected from the group of calcium oxide and zinc (II) oxide, and mixtures thereof. In other words, in these embodiments the three components a), b) and c) are exclusively contained in the curable resin, and no additional components participating in the curing reaction are present. This means that in these embodiments the sum of the weights of a), b) and c) equals the weight of the curable resin excluding the diluent (e.g. water).

The invention therefore also relates to an improved mineral wool product which comprises mineral fibers and a cured resin or binder according to the different inventive embodiments described herein. The mineral wool, thus, in certain embodiments of the invention, comprises mineral fibers and a cured binder, the cured binder obtained by curing at >100° C. a composition comprising any of the previous resin embodiments, in particular a composition comprising a) a saccharide, b) a polycarboxylic crosslinking compound, preferably with a weight average molecular weight <5,000 g/mol, and c) a polyvalent metal oxide curing accelerator, preferably a calcium oxide or a zinc (II) oxide, as well as other optional components and additives as described above. More preferably, the amount of saccharide in the composition ranges from 20-80 wt.-%, the amount of polycarboxylic crosslinking agent ranges from 20-80 wt.-%, and the amount of polyvalent metal oxide curing accelerator ranges from 0.5-10 wt.-%, all amounts related to the sum of the weights of the components a), b) and c). The composition optionally further comprises a polyol different than a saccharide with a molecular weight <400 g/mol, preferably in an amount 1-25 wt.-% related to the sum of the weights of the saccharide, polycarboxylic crosslinking agent and the polyvalent metal oxide.

Another aspect of the invention concerns the use of polyvalent metal oxide as a curing accelerator for a binder in the manufacture of mineral wool materials, wherein the binder comprises a saccharide and a polycarboxylic crosslinking agent. The polyvalent metal oxide is preferably from a divalent metal, and more preferably selected from the group of calcium oxide, zinc (II) oxide and mixtures thereof. Preferably, the saccharide is an oligosaccharide or a polysaccharide with a weight average molecular weight of at least 1,000 g/mol, more preferably at least 10,000 g/mol, and even more preferably at least 100,000 g/mol. The polycarboxylic crosslinking agent is preferably a polycarboxylic compound with a molecular weight of less than 5,000 g/mol. Preferably, the polycarboxylic crosslinking agent is selected from the group of citric acid, succinic acid, tartaric acid, maleic acid, their corresponding anhydrides, the salts thereof, and mixtures thereof.

The inventive mineral wool products can be used for instance in the thermal and acoustic insulation of buildings, conducts, transportations or appliances, or for fire protection, as well as for other non-insulation applications.

Examples

Different inventive and comparative examples of curable resins are described in this section. These examples are included to help to describe the invention, but they are not intended to be limiting.

The raw materials used in the examples are:
Saccharide: Maltodextrin "Maldex 120" with DE 11-15 provided by Tereos Syral.
Polycarboxylic crosslinking agent: Citric acid reagent grade (ref 251275) from Sigma-Aldrich and L-tartaric acid reagent grade (ref 351380) from Sigma-Aldrich.
Polyvalent metal oxide curing accelerator: CaO reagent grade from Sigma-Aldrich (ref 248568); ZnO reagent grade from Sigma-Aldrich (ref 96479).

Different curable resins are prepared at room temperature following this general procedure. The polycarboxylic crosslinking agent is added to water under mechanical stirring. Following this step, the polyvalent metal oxide is added to the aqueous mixture, under continuous stirring. Subsequently, the saccharide is incorporated to the aqueous mixture, and the stirring continued until the components are dissolved.

A number of curable resins with different compositions are prepared, as shown in the following Table 1. The amounts of the respective substances are given as wt.-% in relation to the sum of the weights of the three resin components, saccharide, polycarboxylic crosslinking agent and polyvalent metal oxide.

TABLE 1

| Experiment | Saccharide (wt.-%) Maltodextrin | Crosslinking agent (wt.-%) Citric Acid | Tartaric Ac. | Curing accelerator (wt.-%) CaO | ZnO | Gel-time (min) |
|---|---|---|---|---|---|---|
| 1* | 60.0 | 40.0 | 0 | 0 | 0 | 25 |
| 2 | 59.5 | 39.5 | 0 | 1.0 | 0 | 6 |
| 3 | 58.5 | 38.5 | 0 | 3.0 | 0 | 1 |
| 4 | 59.5 | 39.5 | 0 | 0 | 1.0 | 12 |
| 5 | 58.5 | 38.5 | 0 | 0 | 3.0 | 2 |
| 6* | 60.0 | 0 | 40.0 | 0 | 0 | 33 |
| 7 | 59.5 | 0 | 39.5 | 1.0 | 0 | 15 |
| 8 | 58.5 | 0 | 38.5 | 3.0 | 0 | 16 |

*Experiments 1 and 6 are non-inventive, comparative examples

The amount of each component and the amount of water will depend on the total amount of resin to be prepared and on the concentration of the selected raw materials. Nevertheless, these amounts can be easily calculated by the skilled person from the percentages in Table 1 to obtain curable resin solutions with 50 wt.-% dry weight.

The gel-time for each composition depicted in Table 1 was obtained from rheological measurements. The rheological measurements were carried out with an AR1000 rheometer (TA Instruments). Disposable plate-plate geometry with diameter 25 mm was used. Dynamic measurements in oscillatory mode were performed for approximately 1 mL curable resin sample in 2000 μm gap, applying multiple frequency mode ranging from 1 Hz to 25 Hz and a fixed torque value (tests were performed previously to ensure that the response was in the linear viscoelastic region). Isothermal monitoring was carried out at 140+/−1° C. during maximum 160 min, previously heating up to 140+/−1° C. with ramp rate of 3° C./min. The gel-time was determined and identified graphically by the time corresponding to the cross-over point between storage modulus (G') and loss modulus (G") curves. In this gel-time point, the material changes from a more liquid-like to a more solid-like behavior as result of network formation due to crosslinking. This method is further described in C.-Y. M. Tung and P. J. Dynes, Journal of Applied Polymer Science, 27 (1982) 56.

The results from gel-time depicted in Table 1 for examples 2-5 and 7-8, when compared with the gel-time obtained for comparative experiments 1 and 6, clearly evidence an important reduction of the time required for formation of a crosslinked network when the curing accelerators CaO or ZnO are present in the curable resin, both in amounts of 1 wt.-% or 3 wt.-%. A shorter gel-time means that the curing reaction proceeds at a higher rate, and that the elastic modulus of the resin being cured increases more pronouncedly.

The invention claimed is:

1. A curable resin for the manufacture of mineral wool, comprising components a), b) and c), wherein:
    a) is a saccharide;
    b) is a polycarboxylic crosslinking agent; and
    c) is a polyvalent metal oxide selected from the group of metal oxides consisting of group 2 or 12 of the International Union of Pure and Applied Chemistry periodic table; wherein zinc oxide is absent from the curable resin.

2. The resin of claim 1, where the resin is formaldehyde free.

3. The resin of claim 1, wherein the polyvalent metal oxide is calcium oxide.

4. The resin of claim 1, wherein the amount of the polyvalent metal oxide ranges from 0.5-10 wt.-% in relation to the sum of the weights of the components a), b) and c).

5. The resin of claim 1, wherein the polycarboxylic crosslinking agent is a polycarboxylic compound with a weight average molecular weight <5,000 g/mol.

6. The resin of claim 1, wherein the polycarboxylic crosslinking agent is selected from the group of citric acid, succinic acid, tartaric acid, maleic acid, their corresponding anhydrides, the salts thereof, and mixtures thereof.

7. The resin of claim 1, wherein the resin is substantially free of polymers from unsaturated carboxylic monomers.

8. The resin of claim 1, further comprising:
    a polyol different than a saccharide with a molecular weight <400 g/mol, selected from the group of alkene glycol, sugar alcohol, and mixtures thereof.

9. The resin of claim 1, wherein the saccharide is an oligosaccharide or a polysaccharide with a weight average molecular weight of at least 1,000 g/mol.

10. The resin of claim 9, wherein the oligosaccharide or polysaccharide has a weight average molecular weight of at least 10,000 g/mol.

11. The resin of claim 1, wherein the amount of saccharide is at least 25 wt.-%, related to the sum of the weights of the components a), b) and c).

12. The resin of claim 1, wherein the amount of saccharide a) ranges from 20-80 wt.-%, the amount of polycarboxylic crosslinking agent b) ranges from 20-80 wt.-%, and the amount of polyvalent metal oxide c) ranges from 0.5-10 wt.-%, all amounts related to the sum of the weights of the components a), b) and c).

13. A method for the manufacture of the curable resin of claim 1, comprising: preparing an aqueous composition comprising a saccharide; and contacting the aqueous composition in any order with a polycarboxylic crosslinking agent and with a polyvalent metal oxide selected from the group of metal oxides consisting of group 2 or 12 of the International Union of Pure and Applied Chemistry periodic table; wherein zinc oxide is absent from the curable resin.

14. An aqueous binder for the manufacture of mineral wool, comprising: the curable resin of claim 1, where the binder has a dry weight of 4 to 20 wt.-%, and comprising 1-5 wt.-% of a sane compound or 1-20 wt.-% of oil related to the dry weight of the binder.

15. The aqueous binder of claim 14, wherein the binder is formaldehyde free.

16. A mineral wool product comprising: mineral fibers; and a cured binder, wherein the cured binder is obtained by curing at a temperature larger than 100° C. the resin according to claim 1.

17. A method comprising:
    providing a binder comprising a saccharide and a polycarboxylic crosslinking agent; accelerating curing of the binder to obtain a cured binder using a polyvalent meta oxide selected from the group of metal oxides consisting of group 2 or 12 of the International Union of Pure and Applied Chemistry periodic table; wherein zinc oxide is absent from the cured binder; and using the cured binder to manufacture mineral wool materials.

* * * * *